(12) United States Patent
Wallis et al.

(10) Patent No.: US 9,542,546 B2
(45) Date of Patent: Jan. 10, 2017

(54) SYSTEM AND METHOD FOR IMPLICITLY RESOLVING QUERY SCOPE IN A MULTI-CLIENT AND MULTI-TENANT DATASTORE

(71) Applicant: Volusion, Inc., Austin, TX (US)

(72) Inventors: Jason Wallis, Round Rock, TX (US); Jonathan Gill, Austin, TX (US); Gregory Murray, Austin, TX (US); Rob Hayes, Cedar Park, TX (US)

(73) Assignee: Volusion, Inc., Austin, TX (US)

( * ) Notice: Subject to any disclaimer, the term of this patent is extended or adjusted under 35 U.S.C. 154(b) by 379 days.

(21) Appl. No.: 13/631,391

(22) Filed: Sep. 28, 2012

(65) Prior Publication Data
US 2014/0096221 A1 Apr. 3, 2014

(51) Int. Cl.
*G06F 7/04* (2006.01)
*G06F 21/33* (2013.01)
*H04L 29/06* (2006.01)

(52) U.S. Cl.
CPC .......... *G06F 21/335* (2013.01); *H04L 63/0807* (2013.01); *H04L 2463/102* (2013.01)

(58) Field of Classification Search
USPC .......................................................... 726/10
See application file for complete search history.

(56) References Cited

U.S. PATENT DOCUMENTS

| | | | |
|---|---|---|---|
| 2009/0077233 A1* | 3/2009 | Kurebayashi et al. | 709/224 |
| 2010/0017415 A1* | 1/2010 | Kurumai et al. | 707/10 |
| 2012/0117167 A1* | 5/2012 | Sadja | G06F 17/3089 709/206 |
| 2012/0174198 A1* | 7/2012 | Gould et al. | 726/6 |
| 2013/0024919 A1* | 1/2013 | Wetter et al. | 726/6 |
| 2013/0110961 A1* | 5/2013 | Jadhav | G06F 15/167 709/213 |
| 2013/0138810 A1* | 5/2013 | Binyamin | H04L 41/50 709/225 |
| 2013/0218919 A1* | 8/2013 | Solonchev | 707/758 |
| 2013/0312087 A1* | 11/2013 | Latzina | G06F 21/00 726/19 |
| 2014/0007195 A1* | 1/2014 | Gupta | 726/4 |

* cited by examiner

*Primary Examiner* — Christopher Brown
(74) *Attorney, Agent, or Firm* — Conley Rose, P.C.; Grant Rodolph

(57) ABSTRACT

An apparatus comprising a multi-tenant datastore and a processor coupled to the multi-tenant datastore, wherein the processor is configured to receive a request comprising one or more security tokens, wherein the one or more security tokens comprise identification information, and generate a query based on the request to access the multi-tenant datastore, wherein generating the query comprises deriving a query scope based on the one or more security tokens.

11 Claims, 4 Drawing Sheets

SYSTEM AND METHOD FOR IMPLICITLY RESOLVING QUERY SCOPE IN A MULTI-CLIENT AND MULTI-TENANT DATASTORE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A multi-tenant database or datastore system may have multiple subscribing tenants that access applications and/or data from a network source. Each tenant may, for example, be a merchant that owns a website or electronic store (e-store) maintained by the datastore system. The merchant may use the website to sell products, service, and/or information to customers. With a multi-tenant datastore system, the tenants may have an advantage in the fact that they do not need to install and maintain all hardware and software from the e-store. Rather, each tenant may only need a computing device with network connectivity, such as a desktop computer with Internet access and a web browser. With the computing device, the tenant may access the multi-tenant datastore to operate applications and/or data. Third party developers may also be involved to provide various third party applications to the datastore system. Since different parties including tenants, customers, and third party developers may share a common datastore, it is necessary to prevent unwarranted data/application accesses (e.g., one tenant from accessing data belonging to other tenants). Thus, it is desirable to develop secure and reliable data access schemes to accommodate service to multiple parties involved in the datastore system.

SUMMARY

In one embodiment, the disclosure includes an apparatus comprising a multi-tenant datastore and a processor coupled to the multi-tenant datastore, wherein the processor is configured to receive a request comprising one or more security tokens, wherein the one or more security tokens comprise identification information, and generate a query based on the request to access the multi-tenant datastore, wherein generating the query comprises deriving a query scope based on the one or more security tokens.

In another embodiment, the disclosure includes a method of accessing a datastore comprising receiving a request comprising one or more security tokens, wherein the one or more security tokens comprise identification information, and generating a query based on the request to access the datastore, wherein generating the query comprises deriving a query scope based on the one or more security tokens.

In yet another embodiment, the disclosure includes an apparatus comprising a datastore, and a web server coupled to the datastore, wherein the web server is configured to receive a request comprising at least one security token, wherein the at least one security token comprises identification information, determine a validity of the at least one security token, generate a query based on the request to access the datastore if all of the one or more security tokens are valid, wherein generating the query comprises deriving a query scope based on the at least one security token, and generate an error message if not all of the one or more security tokens are valid.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
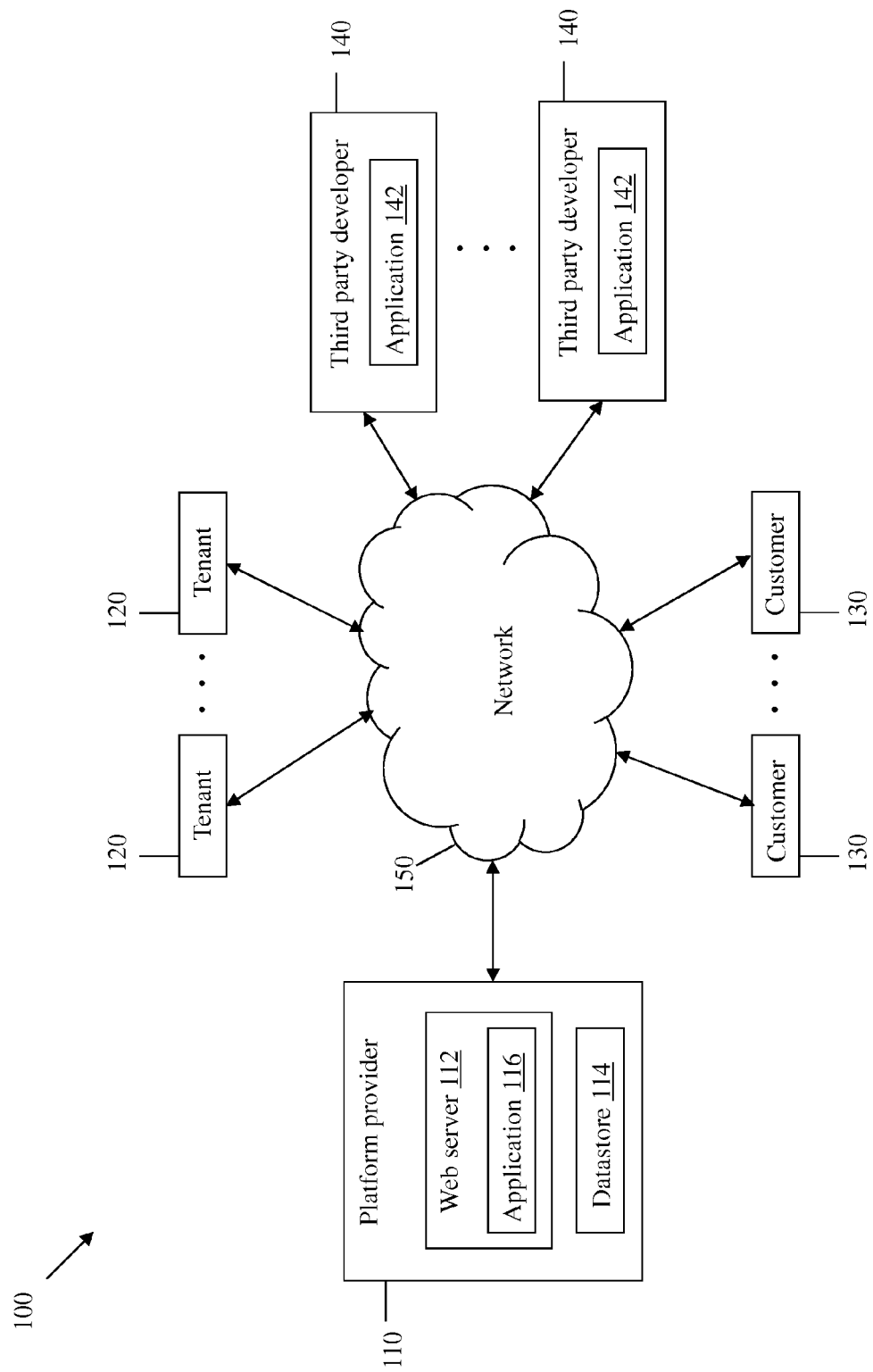
FIG. 1 is a schematic diagram of an exemplary system architecture in which embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A multi-tenant datastore system may involve multiple parties including the implementer of the datastore system, tenants, customers, and independent developers. The implementer may equip the datastore system with infrastructure and built-in applications, while the independent developers may enrich the datastore system with third party applications. When accessing data, a request may be sent from the end of a tenant, a customer, or a third party developer to the datastore system. Upon reception of the request, a server in the system may generate a query based on the request to access the datastore. In generating the query, the server needs to identify a scope of the data that the query pertains to.

In use, the implementation mechanisms of this scope may vary across datastores, and the management of datastores across a physical environment may cause data to be moved between different datastore instances or servers. Consequently, managing the variety of data and/or applications in a multi-tenant datastore system may sometimes be complicated. For example, the multi-tenancy may restrict the implementer or administrator of the datastore system from being able to change how a query scope is managed. Additionally, it may force the implementer to share the contract of how to negotiate a query scope with a third party developer. If the scope is explicitly provided to the third party developer, it may offer an opportunity for the third party developer to maliciously or erroneously access data in an unauthorized scope. Further, the third party developer may be forced to understand and manage semantics of query scope identifiers, which may cause undue complexity. As a result, building and managing multi-tenant applications and/or data may be complex for both the implementer and third party developers. The complexity may lead to undesirable consequences, such as slowing down the rate of innovation at which third party developers add to the platform provided by the implementer.

Disclosed herein are systems and methods for improved management of data and/or application in a datastore system. When generating a query based on a received request, the present disclosure may implicitly derive or resolve a scope of the query, which determines the scope or context of data the query may access. The present disclosure may use one or more authentication or security tokens and a tenant identification (ID) to implicitly derive the query scope. The security tokens may be verified by the system in order to limit access of the query to valid applications, tenants, and users. Two exemplary tokens are described herein, including an application token and a user token. The application token may comprise information regarding an application ID, while the user token may comprise information regarding a user ID. By extracting the tenant ID, a user ID and application ID from the request, the query scope may be automatically derived. Since the disclosed schemes may use already existing security tokens in implicitly deriving the query scope, no additional information from an outside party may be required. Thus, if the query scope is being changed by the implementer of the datastore system, the change may not need to be known by the outside party, which simplifies implementation.

FIG. 1 illustrates an exemplary system architecture 100 in which embodiments of the present disclosure may operate. The system architecture 100 may comprise several parties including a platform provider 110, a plurality of tenants 120, a plurality of customers 130, and one or more third party developers 140. Each of these parties may communicate with each other through a network 150. The network 150 may be any combination of routers and other processing equipment necessary to transmit data or information between the parties 110-140 in the system architecture 100. The network 150 may be, for example, the public Internet or a local Ethernet network. The parties 110-140 may be connected to the network 150 via wired or wireless links. These parties may or may not be separated in terms of physical location (e.g., all parties may be at a same location with different roles).

In use, the platform provider 110 may host and manage a website on behalf of each tenant 120, which may be a merchant subscribing to the platform provider 110. The various websites may serve any purpose such as the sale of goods, services, and/or information to the customers 130, in which case the system architecture 100 may be referred to as an electronic commerce (e-commerce) system. Note that the websites are not limited to e-stores for business purposes, as they may also provide other services to the customers 130, such as public information, personal blog/space, and so forth. Rather than the tenants 120 having their own network infrastructure (e.g., servers) and software to host their own website, the platform provider 110 provides a platform or hosting system, which may include both hardware (e.g., infrastructure including server machine, data storage media, networking facility, etc.) and software (e.g., operating systems, applications, etc.). The tenants 120 may only need to have a computing device (e.g., a desktop computer, laptop computer, smart phone, etc.) with access to the network 150 and a web browser to create their own website or e-store, maintain their e-store, and complete transactions with the customers 130. Similarly, each of the customers 130 may only need a computing device with a web browser and access to the network 150 in order to complete transactions. The terms "tenant" and "customer" in this disclosure may include a computing device of some sort to access the hosting system managed by the platform provider 110 via the network 150.

The hosting system or datastore system may comprise a web server 112 and a datastore 114. The web server 112 may be equipped with a processor, a memory, an operating system, as well as various built-in applications (including application 116), which are software programs implemented by the platform provider 110 to facilitate services to the other parties. For example, the application 116 may be a shipping label printing application that a tenant 120 uses when shipping an order to a customer 130. For another example, the application 116 may be a product recommendation engine. When a customer 130 is shopping on the website of a tenant 120, the recommendation engine may list certain goods on top of a webpage based on any personal preference the customer 130 may have (and that are known or detectable by the application 116).

The datastore 114 may be coupled to the web server 112, or may be included in the web server 112. In use, the datastore 114 may be any type of datastore or database, may be configured to store any suitable data or information, and may be managed by any suitable data management system. In an embodiment, the datastore 114 may be a relational datastore. In this case, it may be managed by, for example, structured query language (SQL), which is a programming language designed for managing data in relational database management systems (RDBMS). In an alternative embodiment, the datastore 114 may be a non-relational datastore managed by a non-relational database management system (NDBMS, also referred to sometimes as NoSQL). The non-relational datastore may be a key-value store allowing data to be stored in a schema-less way (e.g., in a data type of a programming language or an object). Various types of non-relational datastores or NDBMS may include, but are not limited to, Apache Cassandra, Dynamo, Hibari, OpenLink Virtuoso, Project Voldemort, Riak, Greystone Technology M (GT.M), InterSystems Caché, Freebase, Google Appengine, Cloudant Data Layer, Oracle Coherence, NCache, Redis, Hazelcast, Tuple Space, Velocity, BigTable, Berkeley Database (DB), International Business Machines (IBM) Informix C-ISAM, InfinityDB, MemcacheDB, MongoDB, Northgate Information Solutions Reality, Extensible Storage Engine (ESE), jBASE, OpenQM, RavenDB, Revelation Software's OpenInsight, Rocket U2, D3 Pick database, InterSystems Caché, InfinityDB, database for objects (db4o), Eloquera, GemStone/S, InterSystems Caché, JADE, NeoDatis ODB, Objectivity/DB, ObjectStore, Versant Object Database, Wakanda, Zope Object Database (ZODB), Meronymy SPARQL Database, Apache Accumulo, Apache Hbase, Hypertable, Mnesia, Apache River, Tarantool, any other non-relational type, and any combination thereof. Further, although FIG. 1 only shows one datastore 114, it should be understood that a plurality of datastores may be implemented in the hosting system. Each of the plurality of datastores may be relational or non-relational.

In an embodiment, the datastore 114 is a multi-tenant datastore accessible to the plurality of tenants 120 through built-in applications, such as the application 116. In use, each tenant 120 may be limited or restricted to access data authorized to him by the platform provider 110. For example, the datastore 114 may comprise a plurality of tables divided into small groups. Each group of tables may be assigned to a tenant, thus the tenant may only access the group of tables assigned to him. Identification information of the tenant may be used to determine the scope of accessible data.

In addition to built-in applications offered by the platform provider 110, there may be third party applications, such as application 142, developed by one or more third party developers 140. The third party applications may enrich the hosting system by providing better performance than the built-in applications or providing additional features that are otherwise not available. For example, the application 142 may be a shipping label printing application that performs better than the built-in shipping label printing application. In this case, a tenant 120 may elect to subscribe to the third party shipping label-printing application. For another example, the application 142 may be a product recommendation engine that offers more features or functionalities than the built-in product recommendation engine. For instance, a customer 130 may shop on the website of a tenant 120 while being logged onto a social or personal networking site such as FACEBOOK or TWITTER. In this case, the third party recommendation engine may call an application programming interface (API) released by the social site and thereby extract personal preferences of the customer 130 (e.g., favorite book, movie, etc.). Based on the personal preferences, the third party recommendation engine may determine that certain goods are more appealing to the customer 130, and thus list these goods on top of the website of the tenant 120.

In a server-client context, an application (e.g., the application 142) developed by a third party developer 140 may be considered a client, while the hosting system provided by the platform provider 110 may be considered a server. Each client may access the web server 112 via an API, which is a software-to-software interface designed to facilitate communication between two software programs or applications. The API may be released by an entity such as the platform provider 110 to the public, so that third party applications developed by other entities may communicate seamlessly with built-in applications to access the datastore 110. The API is implemented in the background, thus a user using the third party applications may not be aware of its existence. The term "user" as used herein may refer to any person interacting with the host system typically via a computer. For example, the user may be someone associated with a tenant 120 (e.g., owner, administrator, employee, contractor of the tenant website). The user may be a customer 130 interacting with the tenant website, which integrates one or more third party applications. The user may also be a third party developer 140 or someone on behalf of the third party developer 140.

As mentioned above, the datastore 114 may be a multi-client, multi-tenant datastore that supports multiple tenants 120, multiple clients (e.g., the application 142), and multiple customers 130. Consequently, data stored in the datastore 114 may correspond to a variety of scopes or contexts. Thus, embodiments of datastore access schemes are described herein to regulate data access and prevent a user from accessing data assigned to other users, a tenant from accessing data assigned to other tenants, and/or an application from accessing data assigned to other applications.

Figure 2:
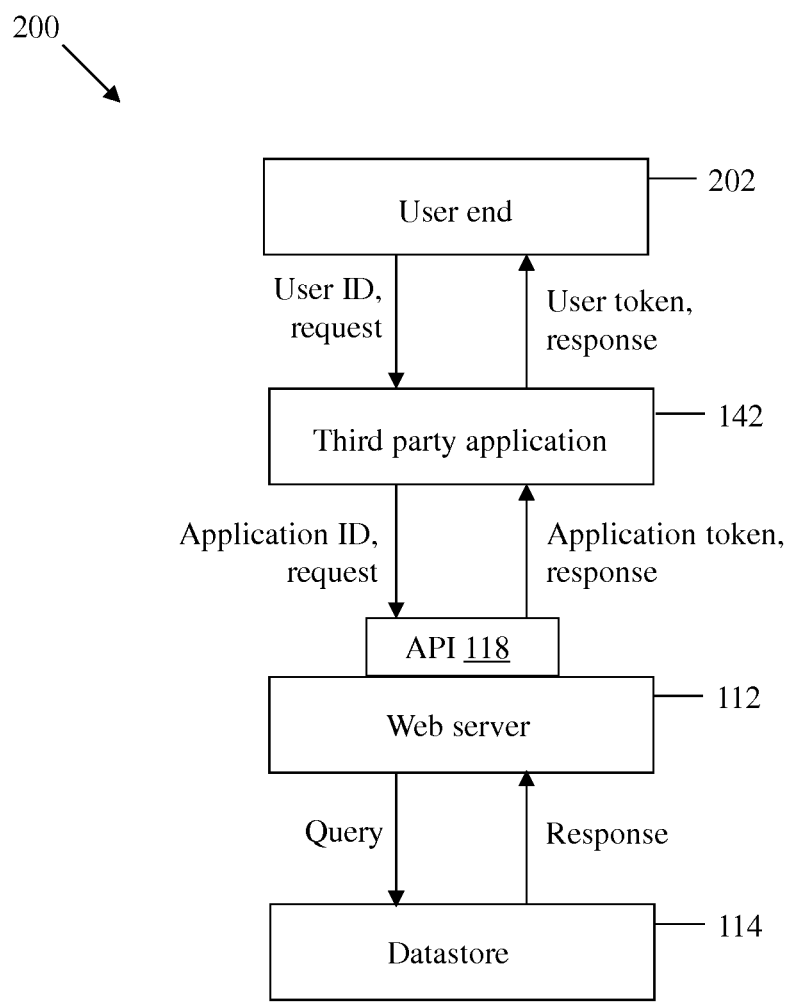
FIG. 2 is a schematic diagram of an embodiment of a datastore access scheme.

FIG. 2 illustrates an embodiment of a datastore access scheme 200, which may be implemented in the system architecture 100. Some aspects of the datastore access scheme 200 may be the same or similar to the system architecture 100, thus the similar aspects will not be further described in the interest of conciseness. In the datastore access scheme 200, the web server 112 may be configured to receive a request from outside the hosting system (i.e., from the third party application 142 or a user end 202), accept the request, and generate a datastore query based on the request to access the datastore 114. In an embodiment, generating the query comprises deriving a scope of the query from one or more security tokens contained in the request. The query scope, once derived, may determine the scope or context of data the query may access.

In an embodiment, prior to accepting the request, the web server 112 may be configured to verify or authenticate the validity of the one or more security tokens contained in the request. Each security token may be a piece of software code or information designed to identify a user or an application. For example, one security token may be an application token, which comprises encrypted information about an application ID. The application ID may be sent by a third party application calling the API 118, and may uniquely identify the third party application from any other application. In an embodiment, the application ID comprises a function identification variable (FID) and a shared secret.

When a new third party application is incorporated into the hosting system for the first time, the application ID may be set up by the hosting system or negotiated between the third party application and the hosting system. A copy of the application ID is stored in the datastore 114. After that, at any given time the third party application 142 may initiate a communication session with the web server 112. In an embodiment, the third party application may initiate the communication by sending its application ID to the web server 112, which may then compare the application ID with another copy in the datastore 114. If the application ID is determined to be valid, the web server 112 may issue an application token back to the third party application. Otherwise, if the application ID is determined to be invalid, the web server 112 may respond by sending an error signal or message back to the third party application 142.

After receiving the application token, the third party application 142 may, for a period of time, freely access its authorized application data in the datastore 114. In an embodiment, the third party application 142 may attach it in every request (e.g., as part of the header) being sent to the web server 112. The application token may be updated after each period of time, a length of which is pre-determined by the web server 112. For example, the web server 112 may require the third party application 142 to re-send the application token after every 15 minutes. For another example, the web server 112 may not require the third party application 142 to re-send the application token unless the application 142 is restarted or has not been active for more than 30 minutes.

Similarly to the application token, a user token may be another security token contained in a request sent from a user end 202 to the web server 112. The user end 202 may represent the end of a tenant, a customer, or a third party developer. The request from the user end 202 may call the web server 112 directly if no third party application is involved. Otherwise, if the third party application 142 is involved, the request may call the API 118 through the third party application 142. In either case, the user token may comprise encrypted information about a user ID, which uniquely identifies a user at the user end 202 from any other user. In an embodiment, the user ID comprises a user name and a password.

When a new user is added for the first time, its user ID may be negotiated between the user end 202 and the hosting system. A copy of the user ID is stored in the datastore 114. After that, at any given time the added user may initiate a communication session with the web server 112. In an embodiment, the user may initiate the communication by sending its user ID to the web server 112, which may then compare the user ID with another copy in the datastore 114. If the user ID is determined to be valid, the web server 112 may issue a user token back to the user. If the user ID is determined to be invalid, the web server 112 may respond by sending an error signal or message back to the user.

After receiving the user token, the user may, for a period of time, freely access user data authorized to him. In an embodiment, the user token may be attached in the header of every user request being sent to the web server 112. The user token may be updated after each period of time, a length of which is pre-determined. For example, the web server 112 may require the user end 202 to re-send the user token after every 15 minutes. For another example, the web server 112 may not require the user end 202 to re-send the user token unless the user end 202 is logged off and back on, or has not been active for more than 30 minutes.

As mentioned above, the web server may generate a query based on a received request, wherein the query scope is derived from one or more security tokens described above. In an embodiment, a hypertext transfer protocol (HTTP) may be used in the datastore access scheme 200. In this case, the received request may further contain a uniform resource locator (URL), and deriving the query scope is further based on the URL. A site or tenant ID may be directly extracted from the URL or translated from the URL. For example, if the URL is "www.kittenmittens.com/api/userdata", the tenant ID may simply be the base portion "www.kittenmittens.com" or "kittenmittens". Then, the tenant ID may be used together with a user token and/or an application token to derive the query scope. Each tenant ID may uniquely identify a tenant from other tenants. Although HTTP is used as an exemplary protocol, it should be understood that any other suitable protocol may also be utilized without departing from principles of the present disclosure.

In implementation, a request received by the web server 112 may contain an application token, a user token, or a tenant ID, or various combinations of the three. Depending on the identification information contained in the request, various query scopes may be derived in the web server 112, and different data types may be accessed in the datastore 114.

Some data in the datastore 114 may be specific to an application but global for all tenants. For example, a shipping label printing application may have configuration settings or variables, such as default page setup, page range control, default portrait/landscape orientation, etc., that are globally applicable to all subscribing tenants. A query scope may limit a query to access these configuration variables based on an application token. Application data belonging to other applications (e.g., the product recommendation engine) may be excluded from the query scope.

Other data in the datastore 114 may be specific to an application as well as a tenant. For example, the shipping label printing application may have tenant-specific information, such as merchant name, logo, etc., which may be stored as tenant data of the application. In this case, a query scope may limit a query to access the tenant data of the application based on an application token and a tenant ID. Tenant data belonging to other tenants (who also use the same application) may be excluded from the query scope.

Yet other data in the datastore 114 may be specific to an application, a tenant, and a user of the application and/or tenant. For example, the shipping label printing application may have tenant-and-user-specific information, such as a tenant user's preference in interface color, window size, and so forth. In this case, a query scope may limit a query to access the tenant-and-user-specific information based on an application token, a user token, and a tenant ID. User data belonging to other users of the same tenant (or other tenants who also uses the same application) may be excluded from the query scope.

Yet other data in the datastore 114 may be specific to a user of a tenant, but independent of any application that may be used by the tenant. For example, the website of the tenant may have many user accounts, each of which is identified by a user name and password. Each user account may have account-specific information, such as user profile, credit card information, and so forth. In this case, a query scope may limit a query to access the account-specific information based on a user token (comprising the username and password) and a tenant ID. Account-specific information belonging to other users of the same tenant as well as information belonging to other tenants may be excluded from the query scope.

Yet other types of data may still be present in the datastore 114, such as data specific to each tenant but global to all applications and all users, data specific to each user of an application but global to all tenants, and so forth. A query scope to access these other types of data may be similarly derived using principles of the present disclosure. Moreover, after the scope of a query is derived, the scope of accessible data for the query may be determined. Then, the web server 112 may perform any suitable read/write operation within the authorized data scope. For example, the web server 112 may create, read, update, and/or delete any data from the authorized data scope. If data or information requested by the request can be located or generated in the hosting system, the web server 112 may generate a response comprising the requested information. Otherwise, if information requested by the request cannot be located or generated in the hosting system, the web server 112 may generate a response comprising an error message or a reminder message.

Since the user token and application token are information already required from the application and user, the disclosed data access scheme 200 may require no additional information in the implicit derivation of query scopes. This may provide convenience to a client (e.g., third party application), as it does not need to provide any additional data (other than application ID) or concern about the contract of query scope negotiation. From the platform provider point of view, the implicit derivation of query scopes may prevent clients from accessing data in an unauthorized scope, because valid credentials are required to generate the security tokens. Further, the disclosed scheme may also allow the platform provider to change implementation details of the scope management solution without having to coordinate with any other parties, since the other parties are shielded from understanding the identifier semantics and implementation details of the query scope. Briefly, users may have a multi-client, multi-tenant datastore without having to worry about multi-client, multi-tenant management.

Figure 3:
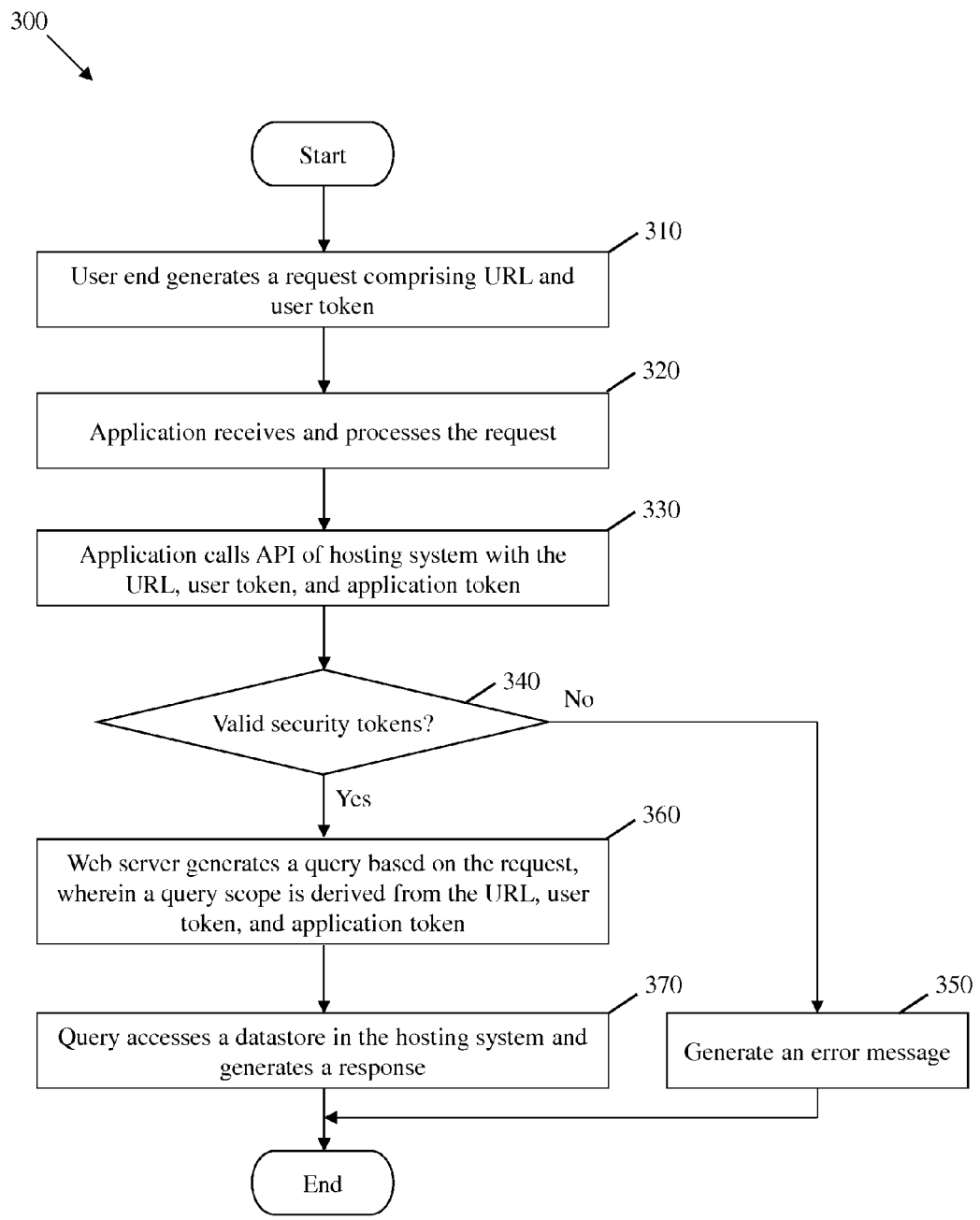
FIG. 3 is a flowchart of an embodiment of a datastore access method.

FIG. 3 is a flowchart of an embodiment of a datastore access method 300, which may be implemented in the system architecture 100. The method 300 assumes that a user token and an application token have been established previously between a hosting system and a user/application.

The method 300 uses HTTP as an example, although any other protocol may also be used. The method 300 starts in step 310, where a request may be generated from a user end, and the request may comprise a URL and the user token. If the request calls a third party application, the request may be sent to the end of the third party application.

In step 320, a third party application may receive and process the request. For example, if the user end is requesting to print a shipping label, the shipping label printing application may translate or convert the request into another request to gather information such as configuration variables, tenant-specific information, and user preferences, etc. In step 330, the third party application may call the API of the hosting system with the request comprising the URL, the user token, and an application token. If no third party application is needed, the steps 320 and 330 may be replaced by a step where the request from the user end is directly received by the hosting system.

In step 340, the method 300 may determine whether the user and application tokens contained in the request from the application is valid. If the tokens are invalid, the method 300 may proceed to step 350, where the web server of the hosting system may generate an error message indicating the invalidity of the tokens. Otherwise, the method 300 may proceed to step 360 where the web server may generate a query based on the request received from the application. Generating the query may comprise deriving a query scope from the user token, the application token, as well as the URL. In step 370, the query may access a datastore in the hosting system, and a response comprising requested information may be generated. The response may be sent back to the user end via the third party application.

It should be noted that the method 300 may only include only a portion of necessary steps in data communication between a hosting system and a user end. Accordingly, other steps, such as the establishment of application and/or user tokens, configuration of error messages if token validity fails, periodical updating of security tokens, etc., may be incorporated into the method 300 wherever appropriate. Moreover, the execution order or sequence of steps may be flexibly changed, e.g., if a step does not depend on a preceding step.

Figure 4:
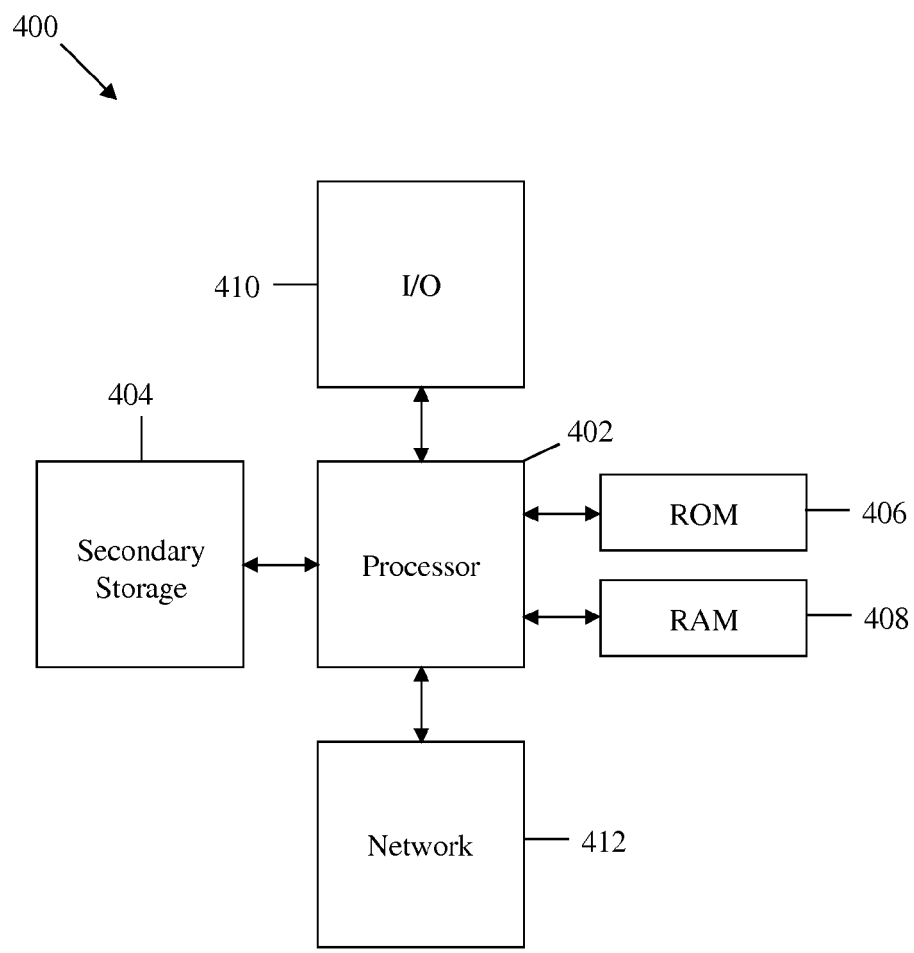
FIG. 4 is a schematic diagram of a general-purpose computer system.

The schemes described above may be implemented on any general-purpose network component, such as a computer or network component with sufficient processing power, memory resources, and network throughput capability to handle the necessary workload placed upon it. FIG. 4 illustrates a typical, general-purpose network component or computer system 400 suitable for implementing one or more embodiments of the methods disclosed herein, such as the datastore access scheme 200 and the datastore access method 300. The general-purpose network component or computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, one or more cores (e.g., a multi-core processor), or may be part of one or more application specific integrated circuits (ASICs) and/or digital signal processors (DSPs). For example, the processor 402 may be part of the web server 112 in FIG. 1. The processor 402 may be configured to implement any of the schemes described herein, including the datastore access scheme 200 and the datastore access method 300. The processor 402 may be implemented using hardware, software, or both.

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a multi-tenant datastore; and
   a hardware processor coupled to the multi-tenant datastore, wherein the processor is configured to:
      receive a request comprising an application token, a user token, and a tenant identifier, wherein the application token identifies one of multiple applications hosted by the multi-tenant datastore, wherein the user token identifies one of multiple users of the multi-tenant datastore, and wherein the tenant identifier identifies one of multiple tenants hosted by the multi-tenant datastore;
      generate a query based on the request to access the multi-tenant datastore, wherein generating the query comprises deriving a query scope based on the request, and wherein the query scope is limited to data in the multi-tenant datastore that is associated with the one of the multiple applications, the one of the multiple users, and the one of the multiple tenants;
      update the application token and the user token after a predetermined interval of time has passed to generate an updated application token and an updated user token; and
      generate a second query to access the multi-tenant datastore, wherein the second query is based on the updated application token, the updated user token, and the tenant identifier,
   wherein the request is sent from a third party application and received by the hardware processor via an application programming interface (API),
   wherein the application token comprises information of an application identification (ID),
   wherein the multi-tenant datastore comprises a plurality of tables divided into groups,
   wherein each group of tables is assigned to one of the multiple tenants, and
   wherein each one of the multiple tenants is limited to only be able to access the group of tables assigned to the one of the multiple tenants.

2. The apparatus of claim 1, wherein the application ID comprises a function identification variable (FID) and a shared secret, wherein the third party application comprises a product recommendation engine, wherein the product recommendation engine lists products on top of a webpage based on a personal preference of a customer, and wherein the personal preference of the customer is obtained through a social networking site.

3. The apparatus of claim 1, wherein the request further comprises a uniform resource locator (URL), wherein deriving the query scope comprises determining the tenant identifier based on the URL, wherein the request is in a hypertext transfer protocol (HTTP) format, wherein the tenant identifier is extracted from the URL, wherein the tenant identifier is a base portion of the URL, and wherein the tenant identifier is used along with the user token and the application token to derive the query scope.

4. The apparatus of claim 1, wherein the user token comprises information of a user identifier, wherein the user identifier comprises a username and a password, and wherein the username and the password are encrypted.

5. A method of accessing a multi-tenant datastore comprising:
   receiving a request comprising an application token, a user token, and a tenant identifier, wherein the application token identifies one of multiple applications hosted by the multi-tenant datastore, wherein the user token identifies one of multiple users of the multi-tenant datastore, and wherein the tenant identifier identifies one of multiple tenants hosted by the multi-tenant datastore;
   generating with a computer hardware processor a query based on the request to access the multi-tenant datastore, wherein generating the query comprises deriving a query scope based on the request, and wherein the query scope is limited to data in the multi-tenant datastore that is associated with the one of the multiple applications, the one of the multiple users, and the one of the multiple tenants;
   receiving an updated application token and an updated user token after a predetermined interval of time has passed; and
   generating a second query to access the multi-tenant datastore, wherein the second query is based on the updated application token, the updated user token, and the tenant identifier,
   wherein the multi-tenant datastore supports a plurality of third party applications,
   wherein the third party applications comprise a product recommendation engine and a shipping label printing application, and
   wherein functions within the product recommendation engine and the shipping label printing application that are available to a user are determined based upon the query scope.

6. The method of claim 5, wherein the request is sent from one of the plurality of third party applications and received by the computer hardware processor via an application programming interface (API), wherein the application token comprises a function identification variable (FID) and a shared secret, and wherein the one of the plurality of third party applications is configured to call an API of a social networking site to extract personal preferences of the user.

7. The method of claim 6, wherein the request further comprises a uniform resource locator (URL), wherein deriving the query scope is further based on the URL, wherein each one of the multiple users of the multi-tenant datastore has a unique user token, wherein each unique user token is associated with one of a plurality of roles, and wherein the plurality of roles comprises owner, administrator, employee, and contractor.

8. The method of claim 6, wherein the user token comprises a username and a password, and wherein the multi-tenant datastore comprises a relational datastore, wherein the relational datastore is managed by structured query language (SQL) designed for managing data in a relational database management system (RDBMS).

9. An apparatus comprising:
a multi-tenant datastore; and
a web server comprising a hardware processor coupled to the multi-tenant datastore, wherein the web server is configured to:
receive a request comprising an application token, a user token, and a tenant identifier, wherein the application token identifies one of multiple applications hosted by the multi-tenant datastore, wherein the user token identifies one of multiple users of the multi-tenant datastore, and wherein the tenant identifier identifies one of multiple tenants hosted by the multi-tenant datastore;
determine validity of the application token and the user token;
generate a query based on the request to access the multi-tenant datastore when the application token and the user token are valid, wherein generating the query comprises deriving a query scope based on the request, and wherein the query scope is limited to data in the multi-tenant datastore that is associated with the one of the multiple applications, the one of the multiple users, and the one of the multiple tenants;
generate an error message when one or both of the application token and the user token are invalid;
receive an updated application token and an updated user token after a predetermined interval of time has passed; and
generate a second query to access the multi-tenant datastore, wherein the second query is based on the updated application token, the updated user token, and the tenant identifier,
wherein the multi-tenant datastore supports a plurality of third party applications,
wherein the request is sent from one of the plurality of third party applications and received by a computer hardware processor via an application programming interface (API),
wherein the application token comprises encrypted information of an application identification (ID), and
wherein the third party applications determine functions available to a user based on a role of the user specified by the user token.

10. An apparatus comprising:
a multi-tenant datastore; and
a web server comprising a hardware processor coupled to the multi-tenant datastore, wherein the web server is configured to:
receive a request comprising an application token, a user token, and a tenant identifier, wherein the application token identifies one of multiple applications hosted by the multi-tenant datastore, wherein the user token identifies one of multiple users of the multi-tenant datastore, and wherein the tenant identifier identifies one of multiple tenants hosted by the multi-tenant datastore;
determine validity of the application token and the user token;
generate a query based on the request to access the multi-tenant datastore when the application token and the user token are valid, wherein generating the query comprises deriving a query scope based on the request, and wherein the query scope is limited to data in the multi-tenant datastore that is associated with the one of the multiple applications, the one of the multiple users, and the one of the multiple tenants;
generate an error message when one or both of the application token and the user token are invalid;
receive an updated application token and an updated user token after a predetermined interval of time has passed; and
generate a second query to access the multi-tenant datastore, wherein the second query is based on the updated application token, the updated user token, and the tenant identifier,
wherein the request further comprises a uniform resource locator (URL),
wherein deriving the query scope comprises determining the tenant identifier based on the URL,
wherein the application token comprises an application identification (ID), and
wherein the application ID is negotiated between a third party application associated with the application token and a hosting system.

11. The apparatus of claim 10, wherein the user token comprises encrypted information of a user identifier, wherein the web server receives multiple requests, and wherein each one of the multiple requests comprises an application token, a user token, and a tenant identifier in a header of the multiple requests.

* * * * *